United States Patent
Budinski

(10) Patent No.: US 8,431,284 B2
(45) Date of Patent: Apr. 30, 2013

(54) LOW ELECTRICAL RESISTANCE BIPOLAR PLATE-DIFFUSION MEDIA ASSEMBLY

(75) Inventor: Michael K. Budinski, Honeoye Falls, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1173 days.

(21) Appl. No.: 11/768,471

(22) Filed: Jun. 26, 2007

(65) Prior Publication Data

US 2009/0004542 A1  Jan. 1, 2009

(51) Int. Cl.
*H01M 2/38* (2006.01)

(52) U.S. Cl.
USPC ............ 429/457; 429/518; 429/534; 429/507

(58) Field of Classification Search .............. 429/457, 429/518, 534, 507
See application file for complete search history.

(56) References Cited

U.S. PATENT DOCUMENTS

| | | | |
|---|---|---|---|
| 6,080,503 A * | 6/2000 | Schmid et al. ............... | 429/483 |
| 6,495,278 B1 | 12/2002 | Schmid et al. | |
| 6,942,941 B2 * | 9/2005 | Blunk et al. ............... | 429/437 |
| 7,063,913 B2 | 6/2006 | Ji et al. | |
| 2005/0014037 A1 * | 1/2005 | Boyer et al. .................. | 429/12 |
| 2005/0244700 A1 * | 11/2005 | Abd Elhamid et al. ......... | 429/34 |

FOREIGN PATENT DOCUMENTS

| | | |
|---|---|---|
| CN | 1833331 A | 9/2006 |
| CN | 1906787 A | 1/2007 |
| DE | 10 2006 048 612 A1 | 4/2007 |
| JP | 2005216598 A | 8/2005 |
| WO | WO 2006/022758 A1 | 3/2006 |

OTHER PUBLICATIONS

Dissertation Martin Dieterruge, ETH Zurich 2003, Diss. ETH Nr. 14901; geboren am Feb. 19, 1964 von Deutschland; Abhandlung.

* cited by examiner

*Primary Examiner* — Jane Rhee
(74) *Attorney, Agent, or Firm* — Fraser Clemens Martin & Miller LLC; J. Douglas Miller

(57) ABSTRACT

A fuel cell assembly and method of forming the same is disclosed, the fuel cell assembly including a membrane electrode assembly, a plurality of diffusion media, and a plurality of bipolar plates, wherein the diffusion media are adhered to the bipolar plates with an adhesive layer adapted to minimize an electrical resistance within the fuel cell assembly.

20 Claims, 3 Drawing Sheets

LOW ELECTRICAL RESISTANCE BIPOLAR PLATE-DIFFUSION MEDIA ASSEMBLY

FIELD OF THE INVENTION

The invention relates to a fuel cell stack system and more particularly to a fuel cell assembly and a method of preparing the same, adapted to minimize an electrical resistance within the fuel cell system, the fuel cell assembly including a membrane electrode assembly having a plurality of diffusion media adhered to a plurality of bipolar plates with an electrically conductive adhesive layer.

BACKGROUND OF THE INVENTION

Fuel cell stack systems (hereinafter fuel cells) are increasingly being used as a power source for electric vehicles and other applications. Different fuel cell types can be provided such as phosphoric acid, alkaline, molten carbonate, solid oxide, and proton exchange membrane (PEM), for example.

In proton exchange membrane (PEM) fuel cells, a hydrogen gas reactant is supplied as a fuel to an anode side of the fuel cell and an oxygen gas reactant is supplied as an oxidant to a cathode side of the fuel cell. The reaction that occurs between the reactant gases in the fuel cell consumes the hydrogen at the anode side and produces product water at the cathode side.

The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA). The MEA is typically sandwiched between "anode" and "cathode" diffusion media or diffusion layers that are formed from a resilient, conductive, and gas permeable material such as carbon fabric or paper. The diffusion media serve as the primary current collectors for the anode and cathode as well as providing mechanical support for the MEA.

The diffusion media and MEA are pressed between a pair of electronically conductive plates which serve as secondary current collectors for collecting the current from the primary current collectors. The plates conduct current between adjacent cells internally of the fuel cell stack in the case of bipolar plates and conduct current externally of the stack in the case of unipolar plates at the end of the stack.

The bipolar plates typically include two thin, facing metal sheets. One of the sheets defines a flow path on one outer surface thereof for delivery of the fuel to the anode of the MEA. An outer surface of the other sheet defines a flow path for the oxidant for delivery to the cathode side of the MEA. When the sheets are joined, a flow path for a dielectric cooling fluid is defined. The plates are typically produced from a formable metal that provides suitable strength, electrical conductivity, and corrosion resistance, such as 316 alloy stainless steel, for example.

The fuel cell stack, which may contain more than one hundred plates, is compressed, and the elements held together by bolts through corners of the stack and anchored to frames at the ends of the stack. In order to militate against undesirable leakage of fluids from between the pairs of plates, a seal or gasket is often used. The seal is typically disposed along a peripheral edge of the pairs of plates. Prior art seals have included the use of an elastomeric material. Additional prior art seals have included the use of a metal seal, such as disclosed in published Patent Cooperation Treaty (PCT) Pat. Appl. No. PCT/EP2003/011347, hereby incorporated herein by reference in its entirety.

Efficient operation of PEM fuel cells may depend on an amount of electrical resistance present in the system, and more particularly to the electrical resistance at an interface between the bipolar plates and the diffusion media of the MEA.

It is desirable to produce a fuel cell adapted to minimize electrical resistance between the bipolar plates and the MEA of a fuel cell assembly to optimize system performance. In the fuel cell described herein, efficient operation of the fuel cell is maximized by adhering diffusion media adjacent a membrane electrode assembly to adjacent bipolar plates with an electrically conductive adhesive layer.

SUMMARY OF THE INVENTION

Concordant and congruous with the present invention, a diffusion media adapted to optimize water management while maximizing the performance of the fuel cell has surprisingly been discovered.

In one embodiment, a fuel cell assembly comprises a membrane electrode assembly including a membrane disposed between a plurality of catalyst layers; a plurality of diffusion media, each having a microporous layer disposed on a side thereof, wherein the side of said diffusion media having the microporous layer is adhered to the catalyst layers of said membrane electrode assembly; a first bipolar plate; a second bipolar plate; and an electrically conductive adhesive layer disposed on at least a portion of said first bipolar plate and said second bipolar plate, wherein said adhesive layer adheres said first bipolar plate to one of said diffusion media and said second bipolar plate to another of said diffusion media to minimize an electrical contact resistance between said diffusion media and said first and second bipolar plates.

In one embodiment, a fuel cell stack comprises a plurality of membrane electrode assemblies, each including a membrane disposed between a plurality of catalyst layers; a plurality of diffusion media, wherein one of said plurality of diffusion media is adjacent each side of said membrane electrode assemblies; a plurality of bipolar plates, each of said bipolar plates having a perimeter portion, wherein each of said bipolar plates is disposed between two of said membrane electrode assemblies; a sealant disposed in a void formed by the perimeter portions of said bipolar plates, wherein said sealant forms a seal between said first bipolar plate, said second bipolar plate, and said membrane electrode assembly; and an electrically conductive adhesive layer disposed on at least a portion of a first bipolar and a second bipolar plate, wherein said adhesive layer adheres the first bipolar plate to one of said diffusion media and said second bipolar plate to another of said diffusion media to minimize an electrical contact resistance between said diffusion media and the first and the second bipolar plates.

In another embodiment, a method for making a fuel cell assembly for use in a PEM fuel cell, comprises the steps of providing a plurality of bipolar plates, each plate having a first working face and a second working face; providing an electrically conductive adhesive layer on the first working face and the second working face of the bipolar plates; providing a membrane electrode assembly having a membrane disposed between catalyst layers; coating a diffusion media with a paste to form a microporous layer thereon; sintering the diffusion media and microporous layers together; adhering the microporous layers of the diffusion media to the catalyst layers of the membrane electrode assembly; adhering the catalyst layers and the proton exchange membrane; adhering the diffusion media to the first working face of one of the bipolar plates with the adhesive layer and adhering another diffusion media to the first working face of another bipolar plate with the adhesive layer.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
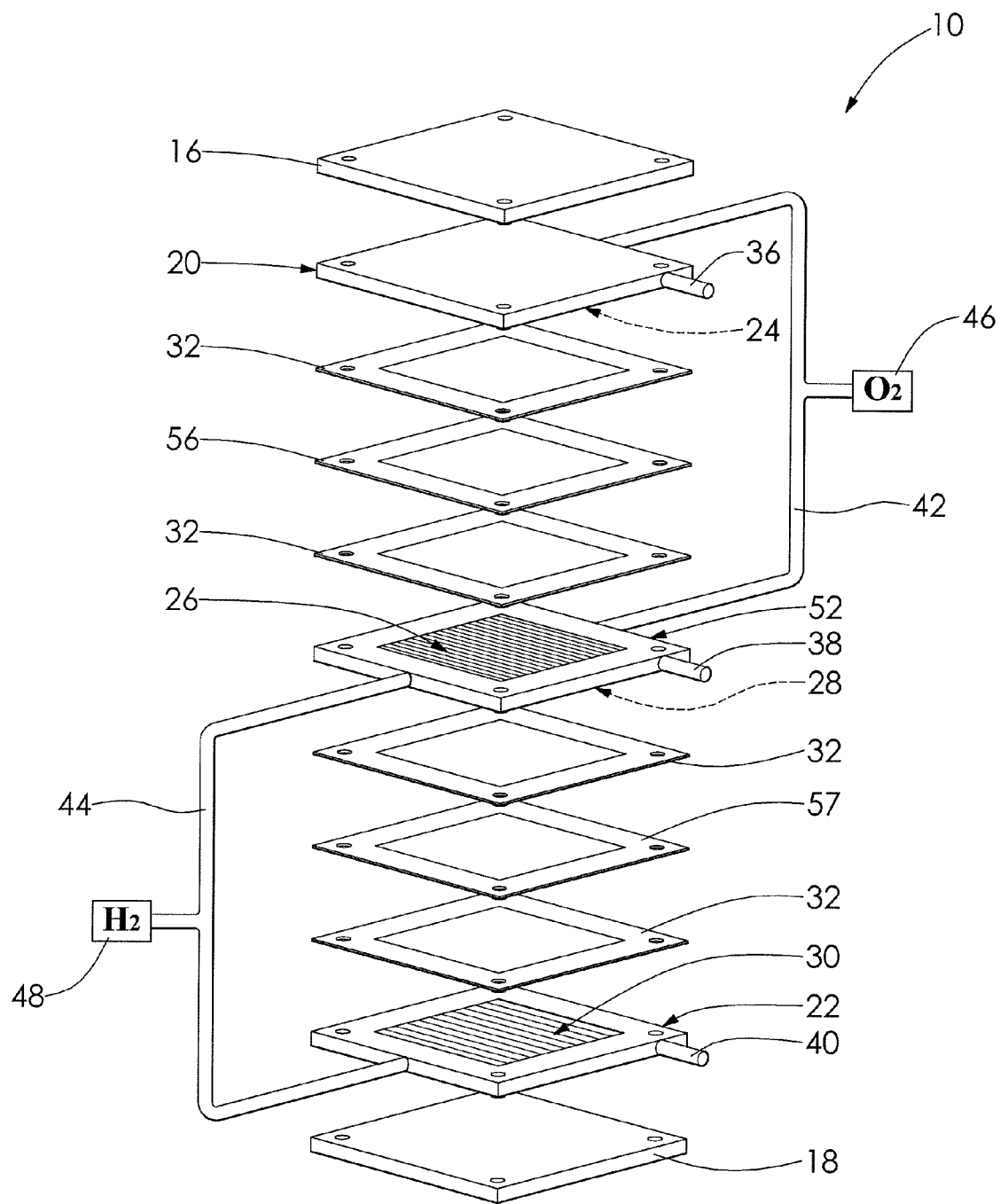
FIG. 1 is an exploded perspective view of a fuel cell stack including two fuel cell assemblies according to an embodiment of the invention.

FIG. 1 illustrates a fuel cell stack 10 including two fuel cell assemblies according to an embodiment of the invention, however, it is understood that any number of fuel cell assemblies and bipolar plates may be used in a typical fuel cell stack, as desired. The fuel cell stack 10 is a two cell PEM fuel cell stack 10 having a pair of membrane-electrode-assemblies (MEAs) 56, 57 separated by an electrically conductive fluid distribution element 52, hereinafter a bipolar plate 52. The MEAs 56, 57 and bipolar plate 52 are stacked together between end plates 16, 18, and end contact elements 20, 22. The bipolar plate 52 and the end contact elements 20, 22 include working faces 26, 28, 24, 30, respectively, for distributing fuel and oxidant gases (e.g., $H_2$ and $O_2$) to the MEAs 56, 57. Nonconductive gaskets 32 provide seals and electrical insulation between the several components of the fuel cell stack 10.

The MEAs 56, 57 are disposed adjacent gas permeable conductive materials known as gas diffusion media. The gas diffusion media may include carbon or graphite diffusion paper. As described herein, the gas diffusion media are adhered to the MEAs 56, 57. The end contact units 20, 22 contact the diffusion media of the MEAs 56, 57. The bipolar plate 52 contacts the diffusion media on the anode face of the MEA 56, configured to accept a hydrogen-bearing reactant, and also contacts gas diffusion media on the cathode face of MEA 57, configured to accept an oxygen-bearing reactant. Oxygen is supplied to the cathode side of the fuel cell stack 10 from an oxygen source 46, for example, via an appropriate supply conduit 42. Hydrogen is supplied to the anode side of the fuel cell from a hydrogen source 48, for example, via an appropriate supply conduit 44. Alternatively, ambient air may be supplied to the cathode side as an oxygen source and hydrogen to the anode from a methanol or gasoline reformer, and the like. Exhaust conduits (not shown) for both the anode and the cathode sides of the MEAs 56, 57 are also provided. Additional conduits 36, 38, 40 are provided for supplying liquid coolant to the bipolar plate 52 and the end plates 16, 18. Appropriate conduits for exhausting coolant from the bipolar plate 52 and end plates 16, 18 are also provided (not shown).

Figure 2:
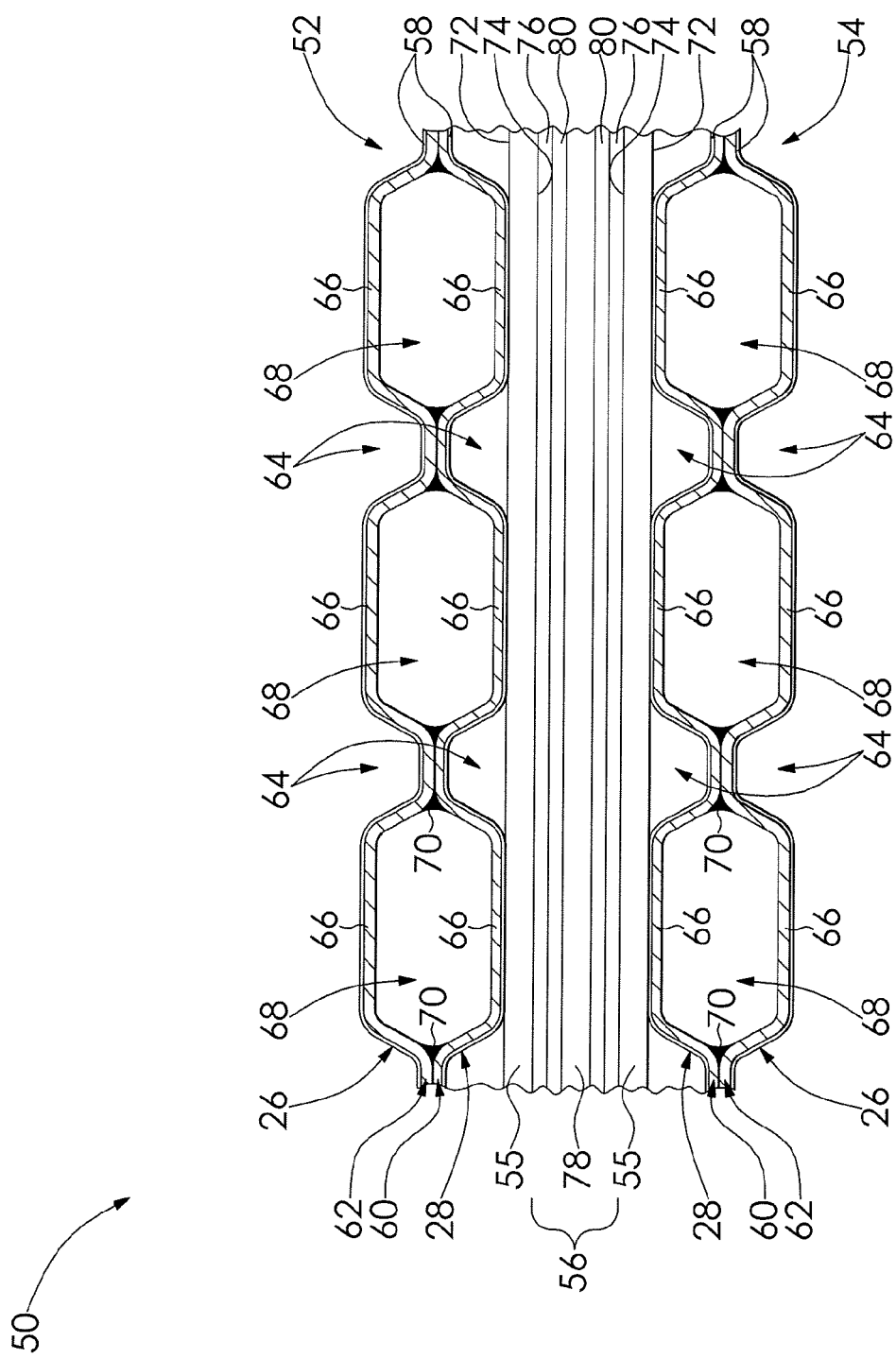
FIG. 2 is a fragmentary cross-sectional view of a fuel cell assembly as shown in FIG. 1.

Referring next to FIG. 2, a fuel cell assembly 50 is shown including a bipolar plate 52 illustrated in FIG. 1 and a second bipolar plate 54. The fuel cell assembly 50 includes a membrane electrode assembly (MEA) 56 disposed between a plurality of diffusion media 55, one of the diffusion media 55 disposed between the MEA 56 and the first bipolar plate 52 and another of the diffusion media 55 disposed between the MEA 56, and the second bipolar plate 54.

The MEA 56 is disposed intermediate the diffusion media 55 and includes a proton exchange membrane (PEM) 78 disposed between two catalyst layers 80. In the embodiment shown in FIG. 2, the PEM 78 is a thin, solid polymer membrane-electrolyte but may be any conventional PEM, as desired. The catalyst layers 80 are formed from platinum supported on high-structure carbon in the illustrated embodiment, but may be any convention catalyst such as a platinum-ruthenium catalyst, for example, as desired.

One of the diffusion media 55 is disposed between a side of the MEA 56 and the first bipolar plate 52 and another of the diffusion media 55 is disposed between another side of the MEA 56 and the second bipolar plate 54. The MEA 56 includes a first side 72 and a second side 74. A microporous layer 76 is disposed on the second side 74 of the diffusion media 55 between the diffusion media 55 and the MEA 56. In the embodiment shown, the diffusion media 55 are carbon fiber paper such as the MRC U-105 paper produced by Mitsubishi Rayon Company. It is understood that the diffusion media 55 may also be a carbon cloth or other conventional material adapted to be electrically and thermally conductive. Furthermore, the diffusion media 55 may be untreated or treated on the second side 74 with a fluorocarbon polymer, as desired. The microporous layers 76 are formed from a carbon powder and fluorocarbon polymer mixture and may be formed from any conventional carbon ink or carbon paste, as desired.

The first bipolar plate 52 and the second bipolar plate 54 are formed from a first unipolar plate 60 and a second unipolar plate 62, and each plate 52, 54 includes the first working face 26 and the second working face 28. Each of the working faces 26, 28 includes a plurality of flow channels 64 adapted to distribute the fuel and oxidant gases across the working faces 26, 28 of the bipolar plates 52, 54. The plurality of flow channels 64 defines a plurality of lands 66 disposed therebetween.

Further, the unipolar plates 60, 62 cooperate to form a flow path 68 intermediate the lands 66 of the unipolar plates 60, 62. The flow path 68 is adapted to facilitate a distribution of a dielectric cooling fluid through the bipolar plates 52, 54. Any number of flow paths 68 may be formed by the unipolar plates 60, 62, as desired. In the embodiment shown, the unipolar plates 60, 62 of the bipolar plates 52, 54 are coupled together with fused tin 70. However, the unipolar plates 60, 62 may be coupled by any conventional means such as with a b-stage adhesive or by weld-adhering, for example, or the bipolar plates 52, 54 may be formed from a single piece of material, as desired. In the embodiment shown, the bipolar plates 52, 54 are formed from 316 stainless steel, but may be formed from any conventional material such as graphite, for example. It is understood that the flow channels 64 may be linear, substantially undulated, serpentine, or may have any other configuration, as desired.

An adhesive layer 58 is disposed on the flow channels 64 and lands 66 of each of the bipolar plates 52, 54. In the embodiment shown, the adhesive layers 58 are adjacent the second sides 74 of the diffusion media 55 and are formed by an electrically conductive b-stage adhesive. The adhesive layers 58 couple the lands 66 of the bipolar plates 52, 54 to the first sides 72 of the diffusion media 55. The adhesive layers 58 may be formed from any electrically conductive material, as desired. The adhesive layers 58 may also be a conductive thermoplastic adhesive, or a combined conductive primer and conductive adhesive.

To assemble the fuel cell assembly 50 shown in FIG. 2, the first unipolar plate 60 is adhered to the second unipolar plate 62 to form the bipolar plates 52, 54. The first unipolar plate 60 may be adhered to the second unipolar plate 62 by any conventional adhering means such as spot welding, laser welding, adhesive, or soldering, for example, as desired. The first unipolar plate 60 is adhered to the second unipolar plate 62 to minimize interfacial electrical resistance through the bipolar plates 52, 54. It is understood that the bipolar plates 52, 54 may be formed from a single, integrally formed plate, as desired. The working faces 26, 28 of the bipolar plates 52, 54 are treated with a primer to facilitate improved adhering of the adhesive layer 58 and unipolar plates 60, 62. The primer may be an acid primer, an alkaline primer, or a self-etching adhesive layer, as desired. The adhesive layer 58 is disposed on the flow channels 64 and the lands 66 of the working faces 26, 28 of the bipolar plates 52, 54. The adhesive layer 58 may be disposed on the bipolar plates 52, 54 by any conventional method such as pressed on or sprayed on, for example, as desired. Also, when the unipolar plates 60, 62 are formed from a metal, the adhesive layer 58 may be applied to the metal during a coil coating process and prior to a stamping process that forms the unipolar plates 60, 62. It is understood that if the bipolar plates 52, 54 are formed from a polymeric material, the adhesive layer 58 may be applied directly to the bipolar plates 52, 54 without applying a primer, or the polymeric bipolar plates 52, 54 may receive a corona discharge treatment or radio frequency glow discharge treatment to facilitate improved adhering of the adhesive layer 58 to the bipolar plates 52, 54.

The diffusion media 55, the microporous layers 76, the PEM 78, and the catalyst layers 80 are assembled together. A paste (not shown) is formed containing a mixture of a carbon powder and fluorocarbon polymers, applied to the second side 74 of the diffusion media 55, and sintered at or near 380° C. to cause the diffusion media 55 and the microporous layer 76 to adhere. Commonly owned U.S. Pat. No. 7,063,913 is hereby incorporated herein by reference to further describe methods for preparing the paste and other materials and processes used in preparing the diffusion media 55. The microporous layer 76 is adhered to a first face of the catalyst layer 80 with a self-blocking mechanism by heating the diffusion media 55, the microporous layer 76, and the catalyst layer 80 at or near 130° C. A second face of the catalyst layer 80 is adhered to a first side of the PEM 78. A second diffusion media 55, microporous layer 76, and catalyst layer 80 assembly is prepared as described above and adhered to a second side of the PEM 78. One of the diffusion media 55 is pressed against the adhesive layer 58 of the bipolar plate 52 and the other diffusion media 55 is pressed against the adhesive layer 58 of the second bipolar plate 54. Once assembled, the fuel cell assembly 50 may be heated to facilitate an improved adhesion of the MEA 56 and bipolar plates 52, 54.

In use, hydrogen is supplied to the end contact element 22 and the anode side of the bipolar plate 52 of the fuel cell stack 10 from the hydrogen source 48. Oxygen is supplied as the oxidant to the end contact element 20 and the cathode side of the bipolar plate 52 from the oxygen source 46. Alternatively, ambient air may be supplied to the cathode side as an oxidant and hydrogen may be supplied to the anode from a methanol or gasoline reformer. At the anode side, the hydrogen is catalytically split into protons and electrons. The protons formed permeate through the PEM 78 to the cathode side. The electrons travel along an external load circuit (not shown) to the cathode side of the MEA 56, thus creating a current output of the fuel cell stack 10. Meanwhile, a stream of oxygen is delivered to the cathode side of the MEA 56. At the cathode side, oxygen molecules react with the protons permeating through the PEM 78, and the electrons arriving through the external circuit to form water molecules (not shown). To avoid flooding the electrodes of the fuel cell assembly 50 and to maintain a degree of hydration of the PEM 78, excess product water and water vapor is caused to flow to the diffusion media 55 by the gas flow through the fuel cell assembly 50. The diffusion media 55 facilitate the removal of the excess product water from the fuel cell stack 10 during wet operating conditions by absorbing the water and wicking it away from the bipolar plates 52, 54. By wicking the water away from the bipolar plates 52, 54 and toward the PEM 78, the PEM 78 maintain a degree of hydration to facilitate adequate conductivity in the fuel cell stack during dry operating conditions. The water in the diffusion media 55 is removed from the fuel cell stack 10 through manifolds (not shown) by the flow of hydrogen and oxygen gas adjacent to and through the diffusion media 55.

Because the adhesive layers 58 are electrically conductive, the contact resistance between the diffusion media 55 and the bipolar plates 52, 54 is minimized. Furthermore, because the adhesive layers 58 provide electrically conductive contact points between the diffusion media 55 and the bipolar plates 52, 54, the amount of compressive force placed on the fuel cell stack 10 to obtain adequate conductivity may be minimized. By minimizing the compressive force, elastic and plastic deformation of the bipolar plates 52, 54 and diffusion media 55 may be minimized, thereby increasing a useful life of the bipolar plates 52, 54. Minimizing the compressive force on the fuel cell stack 10 also militates against the intrusion of the diffusion media 55 into the flow channels 64 of the bipolar plates 52, 54 and fiber creep into the MEA 56.

Figure 3:
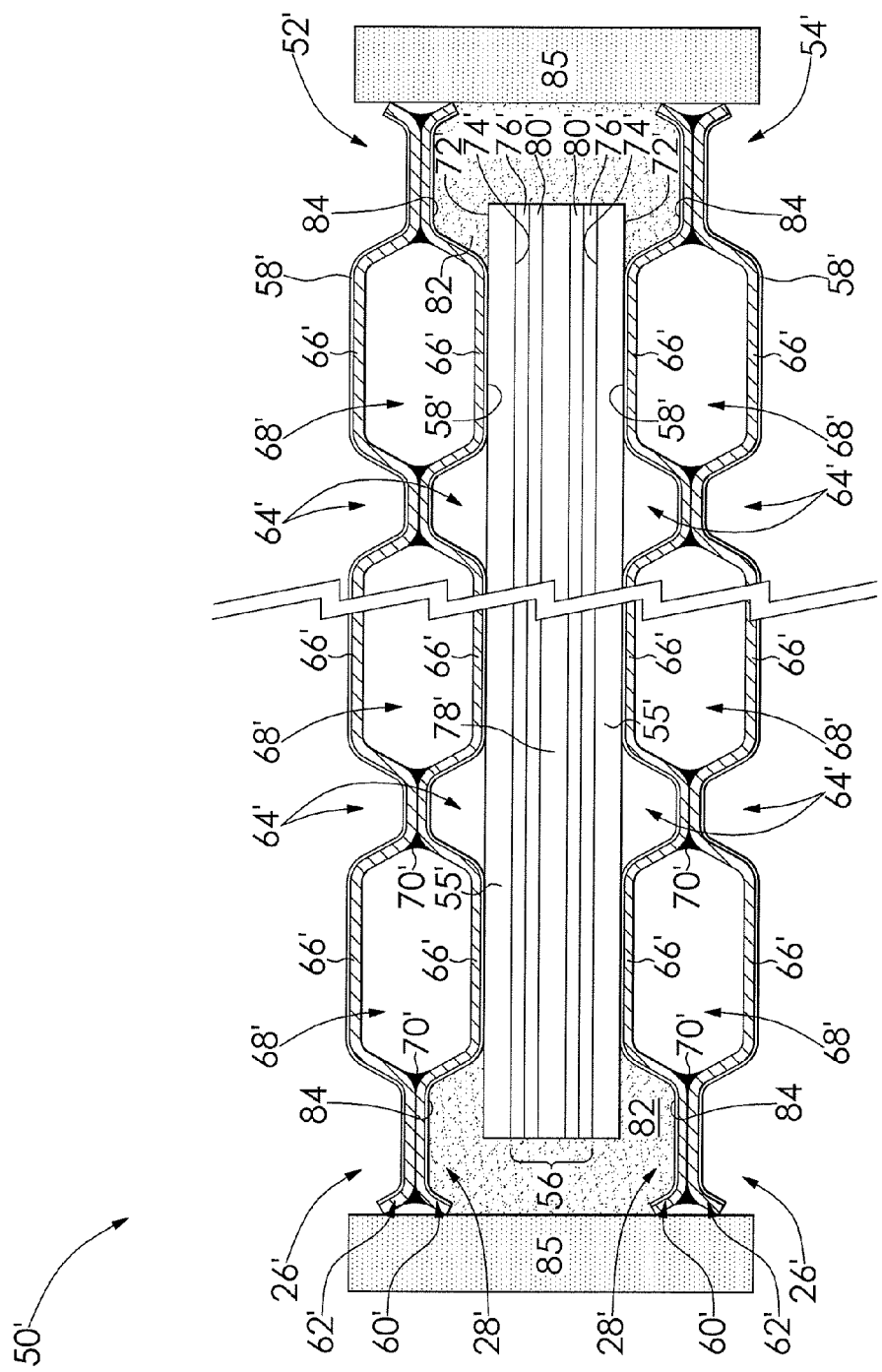
FIG. 3 is a fragmentary cross-sectional view of a fuel cell assembly according to another embodiment of the invention.

Referring next to FIG. 3, a fuel cell assembly 50' is shown according to another embodiment of the invention. The structure repeated from FIG. 2 includes the same reference numerals and a prime symbol ('). The fuel cell assembly 50' includes a membrane electrode assembly (MEA) 56' disposed between a plurality of diffusion media 55', one of the diffusion media 55' disposed between the MEA 56' and a first bipolar plate 52' and another of the diffusion media 55' disposed between the MEA 56' and a second bipolar plate 54'.

The MEA 56' is disposed between the diffusion media 55' and includes a proton exchange membrane (PEM) 78' disposed between two catalyst layers 80'. In the embodiment shown in FIG. 3, the PEM 78' is a thin, solid polymer membrane-electrolyte but may be any conventional PEM, as desired. The catalyst layers 80' are typically formed from platinum, but may be any convention catalyst such as a platinum-ruthenium catalyst, for example.

One of the diffusion media 55' is disposed between a side of the MEA 56' and the first bipolar plate 52' and another of the diffusion media 55' is disposed between another side of the MEA 56' and the second bipolar plate 54'. The MEA 56' includes a first side 72' and a second side 74'. A microporous layer 76' is disposed on the second side 74' of the diffusion media 55' between the diffusion media 55' and the MEA 56'. In the embodiment shown, the diffusion media 55' are carbon fiber paper such as the MRC U-105 paper produced by Mitsubishi Rayon Company. It is understood that the porous diffusion media 55' may also be a carbon cloth or other conventional material adapted to be electrically and thermally conductive. Furthermore, the diffusion media 55' may be untreated or treated on the second side 74', with a fluorocarbon polymer, as desired. The microporous layers 76' are formed from a carbon powder and fluorocarbon polymer mixture, and may be formed from any conventional carbon ink or carbon paste.

The first bipolar plate 52' and the second bipolar plate 54' are formed from a first unipolar plate 60' and a second unipolar plate 62'. Each of the first bipolar plate 52' and the second bipolar plate 54' include a first working face 26' and a second working face 28'. The working faces 26', 28' include a plurality of flow channels 64' formed therein adapted to distribute a fuel and an oxidant gas across the bipolar plates 52', 54'. The plurality of flow channels 64' defines a plurality of lands 66' disposed therebetween.

Further, the unipolar plates 60', 62' cooperate to form a flow path 68' intermediate the lands 66' of the unipolar plates 60, 62'. The flow path 68' is adapted to facilitate a distribution of a dielectric cooling fluid through the bipolar plates 52', 54'. Any number of flow paths 68' may be formed by the unipolar plates 60', 62', as desired. Also, the unipolar plates 60', 62' each form a perimeter portion 84 on an inner surface of an outer peripheral edge of the unipolar plates 60', 62'. The perimeter portions 84 cooperate to form a void adapted to receive a sealant 82. In the embodiment shown, the unipolar plates 60', 62' of the bipolar plates 52', 54' are coupled together with solder 70'. However, the unipolar plates 60', 62' may be coupled by any conventional means such as with a b-stage adhesive or by weld-adhering, for example, or the bipolar plates 52', 54' may be formed from a single piece of material, as desired. In the embodiment shown, the bipolar plates 52', 54' are formed from 316 stainless steel but may be formed from any conventional material such as graphite or a polymer, for example, as desired. It is understood that the flow channels 64' may be linear, substantially undulated, serpentine, or may have any other configuration, as desired.

An adhesive layer 58' is disposed on the flow channels 64' and lands 66' of each of the bipolar plates 52', 54'. In the embodiment shown, the adhesive layers 58' are adjacent the second sides 74' of the diffusion media 55' and is formed by an electrically conductive b-stage adhesive. The adhesive layers 58' couple the lands 66' of the bipolar plates 52', 54' to the first sides 72' of the diffusion media 55'. The adhesive layers 58' may be formed from any electrically conductive material, as desired. The adhesive layers 58' may also be a conductive thermoplastic adhesive, a conductive thermoplastic adhesive, or a combined conductive primer and conductive adhesive.

The sealant 82 is disposed between the voids formed by the perimeter portions 84 of each of the bipolar plates 52', 54', the MEA 56', and an outer portion 85 of a fuel cell stack (not shown) to bond the aforementioned components together and form a seal between the components. In the embodiment shown, the sealants 82 are a hot melt sealant such as an epoxy resin. The perimeter portions 84 may be formed in the outer peripheral edge of the bipolar plates 52', 54' or the perimeter portions 84 may be formed intermediate the outer peripheral edge and the working faces 26', 28' of the bipolar plates 52', 54'. The outer portion 85 may be a gasket, a compression means, or other fuel cell stack component, as desired. It is understood that the sealant 82 may be any conventional material adapted to form a seal between the bipolar plates 52', 54' and the MEA 56'. It is understood that the sealant 82 may be separately formed using an injection molding procedure and disposed in the perimeter portions 84. The sealant 82 may also be applied directly to the perimeter portions 84 of the bipolar plate 52' using a conventional process such as hand coating or spray coating the sealant 82 on the perimeter portions 84.

Also, the sealant 82 may be applied to the unipolar plates 60', 62' during a coil coating process, or the sealant 82 may be a gasket separately formed and disposed in the perimeter portions 84, as desired.

To assemble the fuel cell assembly 50' shown in FIG. 3, the first unipolar plate 60' is adhered to the second unipolar plate 62' to form the bipolar plates 52', 54'. The first unipolar plate 60' may be adhered to the second unipolar plate 62' by any conventional adhering means such as spot welding, laser welding, adhesive adhering, or soldering, for example, as desired. The first unipolar plate 60' is adhered to the second unipolar plate 62' to minimize interfacial electrical resistance through the bipolar plates 52', 54'. It is understood that the bipolar plates 52', 54' may be formed from a single, integrally formed plate, as desired. The working faces 26', 28' of the bipolar plates 52', 54' are treated with a primer to facilitate improved adhering of the adhesive layer 58' and unipolar plates 60', 62'. The primer may be an acid primer, an alkaline primer, or a self-etching adhesive layer, as desired. The adhesive layer 58' is disposed on the flow channels 64' and the lands 66' of the working faces 26', 28' of the bipolar plates 52', 54'. The adhesive layer 58' may be disposed on the bipolar plates 52', 54' by any conventional method such as pressed on or sprayed on, for example, as desired. Also, if the unipolar plates 60', 62' are formed from a metal, the adhesive layer 58' may be applied to the metal during a coil coating process and prior to a stamping process that forms the unipolar plates 60', 62'. It is understood that if the bipolar plates 52', 54' are formed from a polymeric material, the adhesive layer 58' may be applied directly to the bipolar plates 52', 54' without applying a primer, or the polymeric bipolar plates 52', 54' may receive a corona discharge treatment or radio frequency glow discharge treatment to facilitate improved adhering of the adhesive layer 58' to the bipolar plates 52', 54'.

The diffusion media 55', the microporous layer 76', the PEM 78', and the catalyst layer 80' are assembled together. A paste (not shown) is formed containing a mixture of a carbon powder and fluorocarbon polymers, applied to the second side 74' of the diffusion media 55', and sintered at or near 380° C. to cause the diffusion media 55' and the microporous layer to adhere together. The microporous layer 76' is adhered to a first face of the catalyst layer 80' with a self-blocking mechanism by heating the diffusion media 55', the microporous layer 76', and the catalyst layer 80' at or near 130° C. The second face of the catalyst layer 80' is adhered to a first side of the PEM 78'. A second diffusion media 55', microporous layer 76', and catalyst layer 80' assembly prepared as described above is adhered to a second side of the PEM 78'.

The sealant 82 is disposed in the perimeter portions 84 of the first bipolar plate 52'. One of the diffusion media 55' is pressed against the adhesive layer 58' of the bipolar plate 52', and the other diffusion media 55' is pressed against the adhesive layer 58' of a second bipolar plate 54'. Once assembled, the fuel cell assembly 50' may be heated to cause the sealant 82 to bond to the bipolar plates 52', 54' and a perimeter of the MEA 56' and to facilitate an improved adhesion of the MEA 56' and the bipolar plates 52', 54'. The sealant 82' may also form a fluid-tight seal between the MEA 56' and the bipolar plates 52', 54', as desired.

Because the adhesive layers 58' are electrically conductive, the contact resistance between the diffusion media 55' and the bipolar plates 52', 54' is minimized. Furthermore, because the adhesive layers 58' provide electrically conductive contact points between the diffusion media 55' and the bipolar plates 52', 54', the amount of compressive force placed on the fuel cell stack to obtain adequate conductivity is minimized. By minimizing the compressive force, elastic and plastic deformation of the bipolar plates 52', 54' and diffusion media 55' is minimized, thereby increasing a useful life of the bipolar plates 52', 54'. Minimizing the compressive force on the fuel cell stack also militates against the intrusion of the diffusion media 55' into the flow channels 64' of the bipolar plates 52', 54' and fiber creep into the MEA 56'.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell assembly comprising:
   a membrane electrode assembly including a membrane disposed between a plurality of catalyst layers;
   a plurality of diffusion media, each having a microporous layer disposed on a side thereof, wherein the side of said diffusion media having the microporous layer is adhered to the catalyst layers of said membrane electrode assembly;
   a first bipolar plate including a first working face and a second working face;
   a second bipolar plate including a first working face and a second working face; and
   an electrically conductive adhesive layer disposed on at least a portion of at least one of the first working face and the second working face of said first bipolar plate and said second bipolar plate, wherein said adhesive layer adheres said first bipolar plate to one of said diffusion media and said second bipolar plate to another of said diffusion media to minimize an electrical contact resistance between said diffusion media and said first and second bipolar plates.

2. The fuel assembly of claim 1, wherein said first bipolar plate and said second bipolar plate include a plurality of flow channels and a plurality of lands formed along the first working face and the second working face.

3. The fuel assembly of claim 2, wherein said adhesive layer adheres said diffusion media to the lands of the at least one of the first working face and the second working face of said first bipolar plate and said second bipolar plate.

4. The fuel cell assembly of claim 1, wherein said adhesive layer is a b-stage adhesive.

5. The fuel cell assembly of claim 1, wherein said first bipolar plate and said second bipolar plate each include a first unipolar plate having an inner surface and a second unipolar plate having an inner surface, wherein the inner surface of the first unipolar plate is coupled to the inner surface of the second unipolar plate.

6. The fuel cell assembly of claim 5, wherein the inner surface of the first unipolar plates and the inner surface of the second unipolar plates are coupled by one of a b-stage adhesive, soldering, and weld-adhering.

7. The fuel cell assembly of claim 1, further including a primer layer disposed intermediate said first bipolar plate and said adhesive layer and intermediate said second bipolar plate and said adhesive layer.

8. The fuel cell assembly of claim 1, wherein said first bipolar plate and said second bipolar plate each include a perimeter portion adapted to receive a sealant therein.

9. The fuel cell assembly of claim 8, wherein the sealant is adapted to adhere said first bipolar plate, said second bipolar plate, and said membrane electrode assembly and provide and a substantially fluid-tight seal.

10. A fuel cell stack comprising:
    a plurality of membrane electrode assemblies, each including a membrane disposed between a plurality of catalyst layers;
    a plurality of diffusion media, wherein one of said plurality of diffusion media is adjacent each side of said membrane electrode assemblies;
    a plurality of bipolar plates, each of said bipolar plates including a first working face and a second working face and having a perimeter portion, wherein each of said bipolar plates is disposed between two of said membrane electrode assemblies;
    a sealant disposed in a void formed by the perimeter portions of said bipolar plates, wherein said sealant forms a seal between said bipolar plates and said membrane electrode assembly; and
    an electrically conductive adhesive layer disposed on at least a portion of at least one of the first working face and the second working face of said bipolar plates, wherein said adhesive layer adheres one of said bipolar plates to one of said diffusion media and another of said bipolar plates to another of said diffusion media to minimize an electrical contact resistance between said diffusion media and said bipolar plates.

11. The fuel cell stack of claim 10, wherein said plurality of bipolar plates include a plurality of flow channels and a plurality of lands formed along the first working face and the second working face.

12. The fuel cell stack of claim 11, wherein said adhesive layer adheres said diffusion media to the lands of the at least one of the first working face and the second working face of said plurality of bipolar plates.

13. The fuel cell stack of claim 10, wherein said adhesive layer is a b-stage adhesive.

14. The fuel cell stack of claim 10, wherein said bipolar plates each include a first unipolar plate having an inner surface and a second unipolar plate having an inner surface, wherein the inner surface of the first unipolar plate is coupled to the inner surface of the second unipolar plate by one of a b-stage adhesive, soldering, and weld-adhering.

15. The fuel cell stack of claim 10, wherein the seal between said bipolar plates and said membrane electrode assembly is a fluid-tight seal.

16. A method for making a fuel cell assembly for use in a PEM fuel cell, comprising the steps of:
    providing a plurality of bipolar plates, each plate having a first working face and a second working face;
    providing an electrically conductive adhesive layer on the first working face and the second working face of the bipolar plates;
    providing a membrane electrode assembly having a membrane disposed between catalyst layers;
    coating a diffusion media with a paste to form a microporous layer thereon;
    sintering the diffusion media and microporous layers together;
    adhering the microporous layers of the diffusion media to the catalyst layers of the membrane electrode assembly;
    adhering the catalyst layers and the proton exchange membrane;
    adhering the diffusion media to the first working face of one of the bipolar plates with the adhesive layer and adhering another diffusion media to the first working face of another bipolar plate with the adhesive layer.

17. The method of claim 16, wherein the adhesive layers is a b-stage adhesive.

18. The method of claim 16, further including the step of forming the plurality of bipolar plates from a material coil coated with the adhesive layer.

19. The method of claim 16, wherein each of the plurality of bipolar plates include a perimeter portion.

20. The method of claim 19, further including the step of providing a sealant disposed on the perimeter portion of said bipolar plates adapted to seal a first bipolar plate, a second bipolar plate, and the membrane electrode assembly together.

* * * * *